Patented Feb. 12, 1935

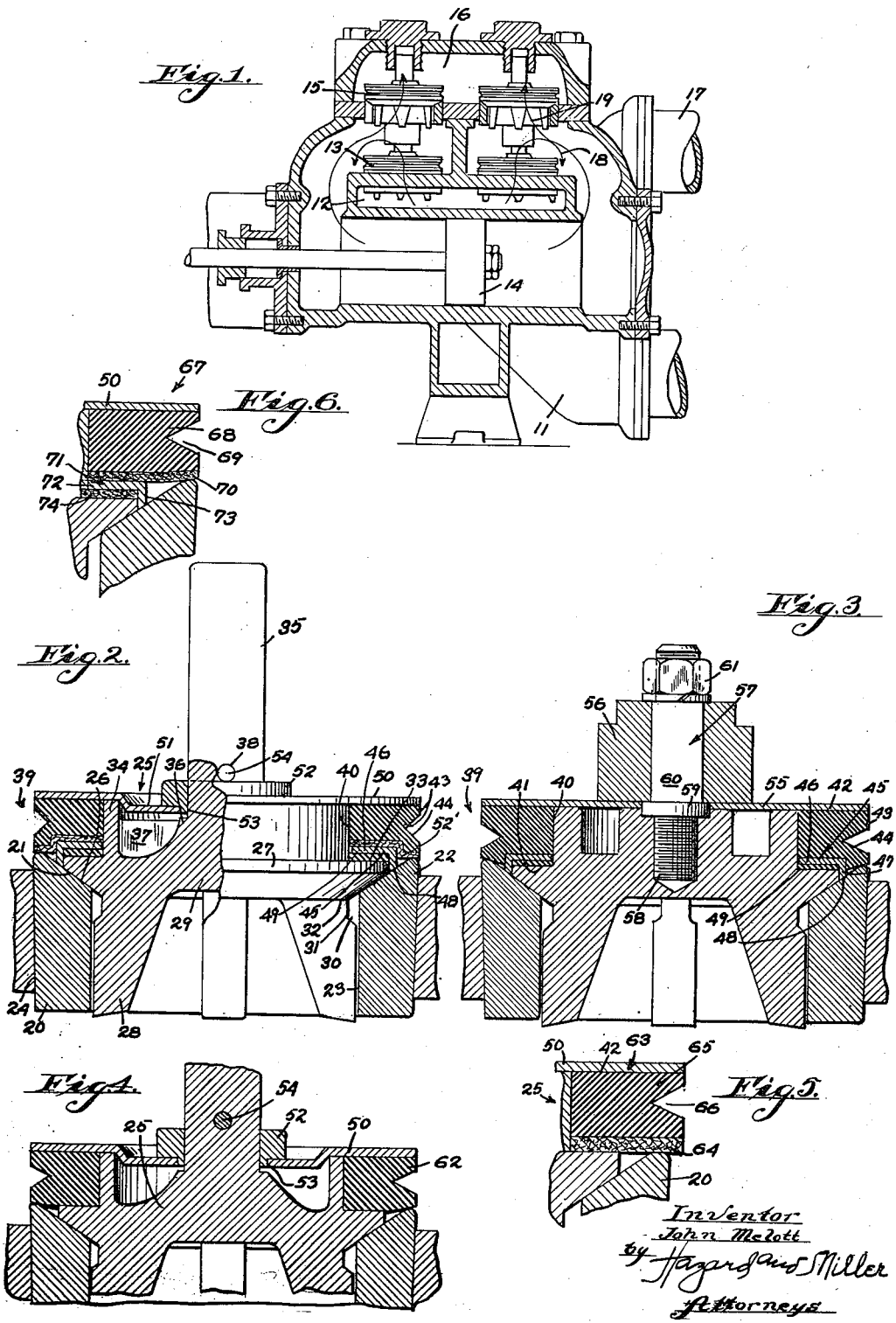

1,990,557

UNITED STATES PATENT OFFICE 1,990,557

VALVE FOR SLUSH PUMPS

John Melott, Los Angeles, Calif., assignor to Charles E. Brown, Los Angeles, Calif.

Application April 17, 1930, Serial No. 445,125

14 Claims. (Cl. 251—127)

My invention relates to the check valves used in what are termed slush or mud pumps such as used in hydraulic well digging or boring.

My invention pertains to a type of mud or slush pump valve having a conical valve seat and a conical valve plug bearing or seating thereon and in which there is a rubber packing or ring to engage the valve seat.

In this type of valve an object and feature of my invention relates principally to the construction and mounting of the rubber sealing ring or packing and the specific construction of the valve seat with which this co-operates and the manner of retaining the ring on the valve plug. In this connection I provide a ring which has considerable resiliency and is so arranged that there is little likelihood of this ring shearing.

This type of valve embodies some of the features set forth in my patent application Serial Number 243,057 filed December 28, 1927 for Valves for slush pumps in which a convexly curved valve seat is engaged by the rubber ring or packing, as I found that the pebbles and grit in the slush and mud are more readily freed from the rubber packing with this type of contact and do not interfere to such a great extent with the operation of the valve as when the rubber bears on a flat seat. One of the features which gives an improved sealing and operation of the rubber ring of my present valve is in providing an angular groove or notch in the periphery of the ring which allows this ring to be pressed upwardly by the contact of the lower outer portion with the convexly curved section of the valve seat.

Another object and feature of my invention is employing a direct non-yielding metal to metal contact of the valve seat and the valve plug and in conjunction with this using a metal to metal seal in which one of the metal parts has a resilient mounting, this resilient mounting being preferably by having the second metal sealing means supported in the rubber ring and in this connection the rubber ring gives a sealing action against the marginal portion of the valve seat. In this construction I preferably form the valve seat with an inward conical downward taper and form a valve plug to correspond in conical taper, the plug and the seat having a non-yielding bearing one against the other. The resilient metal to metal seal is formed by mounting an angular metal structure in the rubber ring whereby this has a more or less resilient bearing on the valve seat. This ring is usually made in the form of an angle with a horizontal flange incorporated in the rubber ring and with a cylindrical flange engaging the valve seat. The rubber ring projects beyond the metal sealing element mounted therein and engages the convex marginal portion of the valve seat.

A further feature of my invention is the employment of a composite resilient and yieldable valve ring in which I incorporate leather with the rubber, the leather having a direct bearing on the seat and yielding with the rubber.

In another construction I utilize the yielding metal sealing element in conjunction with a composite rubber and leather ring.

My invention is illustrated in connection with the accompanying drawing in which Figure 1 is a longitudinal section thru a typical slush or mud pump. Figure 2 is a vertical section thru the valve seat showing the valve plug in partial elevation and partial section with the other seating elements incorporated. Figure 3 is a vertical section of another valve showing a different form of guide secured to the valve plug. Figure 4 is a vertical section thru a valve showing a simpler construction with the resilient metal sealing element omitted. Figs. 5 and 6 are sectional details of modified forms of valve seating elements.

Referring to the drawing and in Figure 1 there is illustrated a type of pump which has an intake 11 which enters the pump at 12. This flows thru the valves 13. On reciprocation of the piston 14 the fluid is forced out thru the discharge valves 15 into the outlet chamber 16 whence it is carried by the discharge pipe 17. The flow of the fluid on the intake stroke is indicated by the arrows 18 and on the out stroke by the arrows 19.

In the construction of the valve shown in Figure 2 there is a valve seat 20 which has a conical seat 21 sloping inwardly and downwardly and which is provided with a convexly curved marginal edge 22. The seat has a vertical cylindrical face 23 and is provided with a slightly tapered outer face 24 to fit in the metal structure of the valve body.

The valve plug designated generally at 25 has a conical surface 26 with a cylindrical edge 27 above this conical surface. There are guide fingers 28 which extend downwardly from the body part 29 of the plug and these have a cutaway section 30 at the upper portion having an upper vertical edge 31 forming a continuation of the inner edge 32 of the conical portion of the plug. It will, therefore, be seen that the conical surface of the plug extends considerably inside of the cone of the valve seat.

The valve is provided with a horizontal annular shoulder 33 and an upstanding rim 34. A stem 35 extends upwardly from the body portion 29 of the plug, there being a slight shoulder 36 adjacent the hollowed out section 37. An opening 38 for a pin 54 is provided in the stem.

A rubber ring designated generally by 39 has an inner cylindrical surface 40 which bears on the outside of the rim 34 of the plug and may be formed with a lower horizontal surface 41 to bear on the shoulder 33. The top surface 42 of the ring is flat. The outer periphery 43 is indicated as cylindrical with a V-shaped notch or groove 44 extending inwardly from the peripheral surface.

The resiliently mounted metal sealing ring designated generally by the numeral 45 is formed angular in shape and has a horizontal flange 46 which may be embedded in the rubber and a cylindrical section 47 depending therefrom having a conical edge 48 to conform to that of the valve seat and to bear thereon.

If desired, the small section of rubber 49 below the flange 46 may be formed of a separate piece similar to a washer or, if desired, the angular member 45 may be moulded in the rubber when it is cast.

The metal plate 50 is utilized to hold the rubber ring in position and in Figure 2 this is illustrated as having a depressed section 51 and held in place by a collar 52 with a small depending flange 53 fitting between the inner edge of an opening in the plate 50 and the stem 35. The collar 52 is held in place by a pin 54 which is driven thru the stem. The resilient ring is formed with a cupped leather washer 52', the washer engaging the valve seat.

In the construction illustrated in Figure 3 the main characteristics of the valve plug and valve seat with a mounting of the rubber ring and the resiliently mounted rubber ring and the resiliently mounted metal sealing member are substantially the same as Figure 2. In this case, however, the metal plate 55 which bears on the upper side of the ring is held in place by a guide block 56 and for this purpose I employ a stem 57 which has a screw threaded section 58 threaded into the body of the plug. There is a collar 59 and cylindrical section 60 of the stem and the upper end is provided with a nut 61. This construction clamps the rubber ring with a resiliently mounted metal contact ring firmly to the valve plug.

In the construction of Figure 4 the rubber ring is designated 62 and in this case there is no resiliently mounted metal sealing member connected to the ring but the rubber ring bears on the outer periphery of the valve seat in the manner shown in connection with Figures 2 and 3. It is obvious that in this construction of the ring the valve plug and the means for obtaining the ring in place may be as shown in either Figures 2 or 3.

Referring first to the action of the valve of Figure 4 it will be seen that there is a metal to metal contact between the valve plug 25 and the seat 20, such contact being made by the metal surfaces 21 and 26 engaging each other. This forms a non-yielding metal to metal contact. The outer portion of the rubber ring engages the convex peripheral portion of the valve seat and the rubber is sufficiently thick so that it is bent upwardly slightly thereby compressing the rubber at the outer lower portion of the ring. The annular V-shaped notch 44 is slightly collapsed or decreased in size and, therefore, the action of the outer portion of the rubber ring on the valve seat is principally taken up by the lower portion of the ring and this does not tend to shear the rubber ring, and even if grit or pebbles are held between the rubber ring and the valve seat the rubber of the ring is not sufficiently distorted as a whole to materially damage the rubber. The grit or pebbles are readily released by the rubber ring engaging the convex curved portion of the seat on succeeding strokes even tho the grit and pebbles become more or less embedded in the rubber when it is under compression they are released on the change of stroke. Another function of the V-shaped notch is that the pressure on the top of the valve may operate on the lower portion of the rubber ring below the notch and thus bring this ring into close sealing contact with the curved portion of the valve seat.

The construction having the resiliently mounted metal sealing ring incorporated in the rubber ring is arranged so that in the normal operation of the valve the bearing surface 48 of the resiliently mounted ring comes in contact with the valve seat before the conical surface of the valve plug, and, hence, the rubber is slightly compressed by forcing the resiliently mounted ring upwardly, thus these two metal parts form a contact with the seat, the plug and seat forming a non-resilient metal to metal contact and the metal ring on the seat forming a yielding metal to metal contact. The outer portion of the rubber ring functions to form a seal in the same manner as if there were no resiliently mounted ring incorporated in the rubber.

The advantage of the type of valve shown in Figures 2 and 3 is that it gives a triple seal, and when the plug approaches the valve seat the resiliently mounted ring first seals against the valve seat, secondly, the rubber ring bears against the marginal portion of the valve seat, and, lastly, the cone shaped part of the plug engages the seat. With this action should there be grit between the plug and the seat this has an opportunity to become free before the actual closing of the plug on the seat. The resiliently mounted ring having comparatively narrow bearing on the valve seat cannot readily trap pebbles or the like, however, any pebbles or large pieces of grit caught by the resilient ring will become more or less pressed into the rubber ring on the compression stroke and released on the release of such compression.

In Fig. 5 I illustrate a composite, resilient valve element in which I employ the same type of valve seat and valve plug as in the other illustrations but utilize a yielding ring 63 which is a composite construction having a leather portion 64 at the bottom and a rubber portion 65 forming the upper part, this having a notch 66. By this arrangement the leather comes in contact with the outer portion of the valve seat, and if there is a large amount of grit in the slush or mud being pumped, the leather forms a good sealing element and does not wear quite as readily as the rubber. The leather may be secured to the rubber by vulcanizing or the like and forms a harder surface to contact with the valve seat, and also prevents shearing off of the corner of the rubber.

In Fig. 6 I illustrate the same type of seat and valve plug as in the other figures. In this case the yielding ring 67 has a rubber portion 68 having a notch 69 therein, a leather wearing section 70 to contact with the outer curved portion of the valve seat. There is a metal yielding sealing element 71 which has a horizontal section 72 and a cylindrical section 73 forming a bearing on the valve seat. Preferably, there is a leather ring 74 underneath the metal ring. This leather ring, the metal ring 72, the leather 70, and the rubber 68 are all secured together. This gives a yieldable mounting for the metal to metal seal and the leather facing in contact with the valve seat gives a hard wearing surface.

A feature of my invention is having either the double or the triple seal in which the rubber or the resilient ring is brought into contact with the valve seat but the metal gives a cushioning action and lessens the severity of the blow of the valve plug on the valve seat. An important feature of having the notch or annular groove in the resilient ring is that when the metal seat becomes worn where it has the metal to metal contact the annular groove may be reduced in size as the rubber is compressed without subjecting the rubber to shearing stresses.

Various changes may be made in the details of construction without departing from the spirit or scope of the invention as defined by the appended claims.

I claim:

1. A device as described comprising a valve structure having a conical valve seat tapered inwardly and downwardly, a valve plug having a complementary bearing surface to have a non-yielding metal to metal contact with the seat, a resiliently mounted metal sealing ring positioned on the peripheral portion of the plug and having a yielding metal to metal bearing on the conical seat, the sealing ring being mounted in a rubber ring to give the resilient mounting and the said rubber ring having a bearing on the peripheral portion on the seat.

2. A device as described comprising a valve structure having a conical valve seat inclined inwardly and downwardly, a valve plug having a complementary surface to form a non-yielding metal to metal contact with the seat, the seat having a marginal edge convexly curved considered transversely, a rubber ring mounted on the plug and engaging the convex portion of the seat, and a sealing ring mounted in the rubber ring having a yielding metal to metal contact with the seat.

3. A device as claimed in claim 2, the sealing ring having a cylindrical portion extending downwardly from the rubber ring and the rubber ring having a peripheral groove.

4. A valve having a valve seat, a valve plug having a non-yielding metal to metal contact therewith, a resilient rubber ring mounted on the plug to bear on part of the seat, and a rigid metal sealing ring mounted in the rubber ring and having a resilient mounting therein, the sealing ring engaging the metal seat with a yielding bearing thereon.

5. A valve as claimed in claim 4, the portion of the rubber ring bearing on the seat having a leather facing.

6. In a device as described, a conical valve seat, a plug having a conical portion forming a metal to metal non-yielding bearing thereon at the lower portion of the seat, a resilient rubber ring mounted on the upper portion of the plug and having a rigid metal sealing ring mounted therein, said metal ring having a resilient mounting and having a cone shaped contacting edge to bear on the cone shaped valve seat, the said rubber ring being adapted to bear on the upper and outer portion of the valve seat.

7. In a device as described, a valve seat having a lower conical portion and an upper convex portion extending from the conical portion outwardly, a valve plug having a conical portion to form a metal to metal non-yielding bearing on the lower portion of the conical seat and having an annular flat shoulder with a resilient rubber ring mounted thereon, said ring having parallel lower and upper surfaces and having a lower surface covering adapted to bear on the convex portion of the seat, a metal ring having a portion thereof incorporated in the rubber ring and having a conical bearing edge to bear on the conical portion of the valve seat.

8. In a device as claimed in claim 7, the rubber ring having an annular groove on its peripheral face.

9. In a device as claimed in claim 7, said lower surface covering being formed of leather.

10. In a device as claimed in claim 7, said lower surface covering being formed of leather and said rubber ring having an annular groove in its peripheral face.

11. A device as described, comprising a valve structure having a conical seat and an upward extension of said seat, said extension having a convex curve, a non-yielding valve plug having a non-yielding support and having a conical bearing surface to bear on the conical seat with a horizontal annular surface above the bearing surface, and a cylindrical neck extending thereabove, a resilient ring mounted on the cylindrical neck and having flat parallel lower and upper surfaces when the valve plug is raised from its seat, the lower flat surface bearing on the annular surface of the plug, a confining plate on top of the plug engaging the upper flat surface of the ring, the peripheral portion of said ring being unconfined and having a peripheral notch, the lower surface of the ring bearing on the convex curved portion of the seat, there being an annular space formed by a portion of the valve seat, the valve plug, and the under surface of the resilient ring, the resilient ring having a leather facing on its under surface, the leather facing forming the wearing contact surface bearing on the convex curve of the seat.

12. A device as claimed in claim 11, the resilient ring having a metal sealing ring mounted therein, said metal sealing ring having a downturned annular portion with a conical edge to bear on the conical seat immediately adjacent the peripheral portion of the bearing surface of the plug.

13. A device as described, comprising a valve structure having a conical seat and an upward extension of said seat, said extension having a convex curve considered transversely, a rigid valve plug having a conical bearing surface to bear on the conical seat with a horizontal annular surface above the bearing surface and a cylindrical neck extending thereabove, a resilient ring mounted on the cylindrical neck, a confining plate on top of the plug engaging the upper surface of the ring, the peripheral portion of said ring being unconfined, the lower outer surface of the ring bearing on the convex curved extension of the seat, a metal sealing ring having a horizontal flange embedded in the resilient ring and having a cylindrical depending section with a conical lower edge bearing on the valve seat.

14. In a device as described, a valve seat having a conical bearing surface sloping inwardly and downwardly, a valve plug having a surface complementary thereto and having a horizontal shoulder, the seat having a marginal edge of convex curvature considered transversely from said bearing surface outwardly, a resilient ring mounted on the plug having parallel lower and upper surfaces, the inner portion of the lower surface bearing on the horizontal shoulder of the plug and the outer portion engaging the convex curve of the seat, a plate connected to the plug and engaging the upper surface of the ring and extending to the margin thereof, the said ring having an annular notch in its periphery, the periphery of said resilient ring being unconfined, the resilient ring having a metal ring mounted therein, said metal ring having an annular surface to bear on the valve seat.

JOHN MELOTT.